Figure 1:
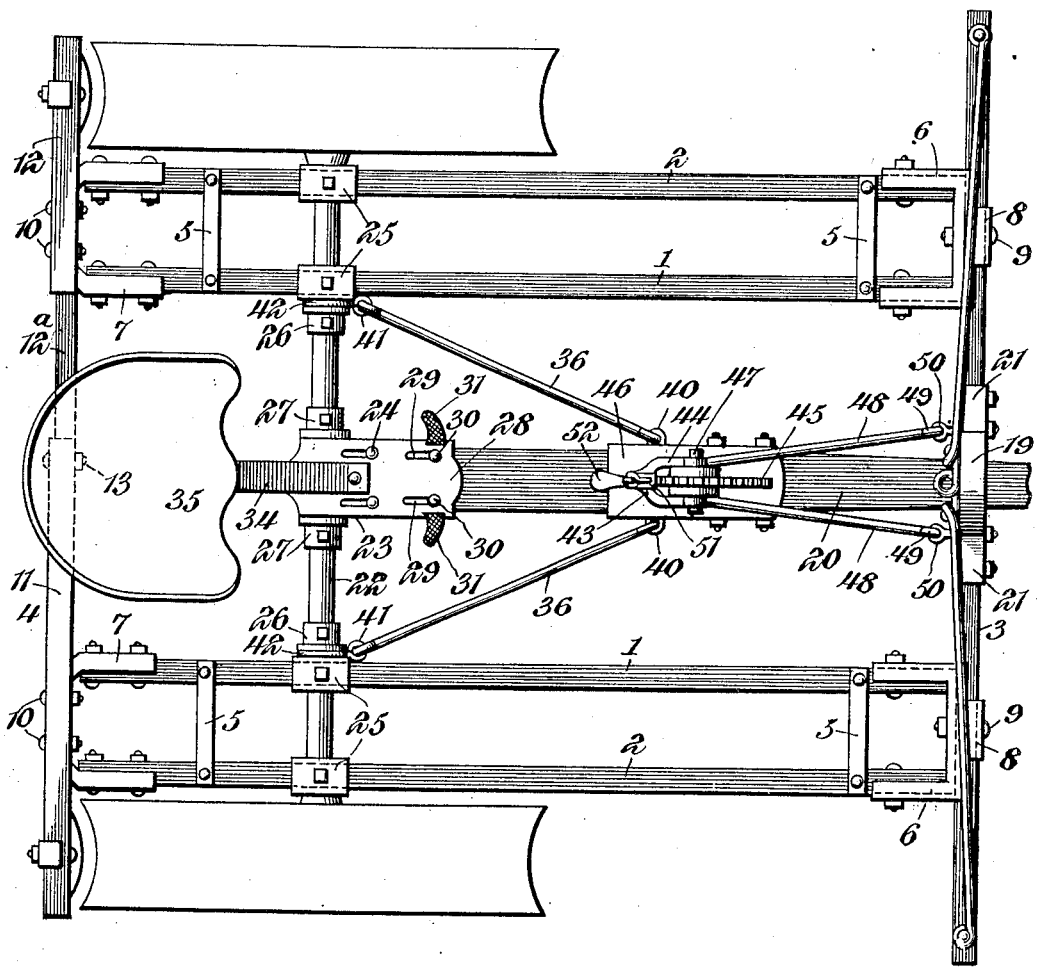

No. 876,297. PATENTED JAN. 7, 1908.
P. CHRISTIANSSON.
FRAME FOR AGRICULTURAL MACHINES.
APPLICATION FILED JUNE 4, 1907.

3 SHEETS—SHEET 1.

Witnesses
Howard D. Orr
H. F. Riley

Pehr Christiansson, Inventor,
By E. G. Siggers
Attorney

No. 876,297. PATENTED JAN. 7, 1908.
P. CHRISTIANSSON.
FRAME FOR AGRICULTURAL MACHINES.
APPLICATION FILED JUNE 4, 1907.
3 SHEETS—SHEET 2.
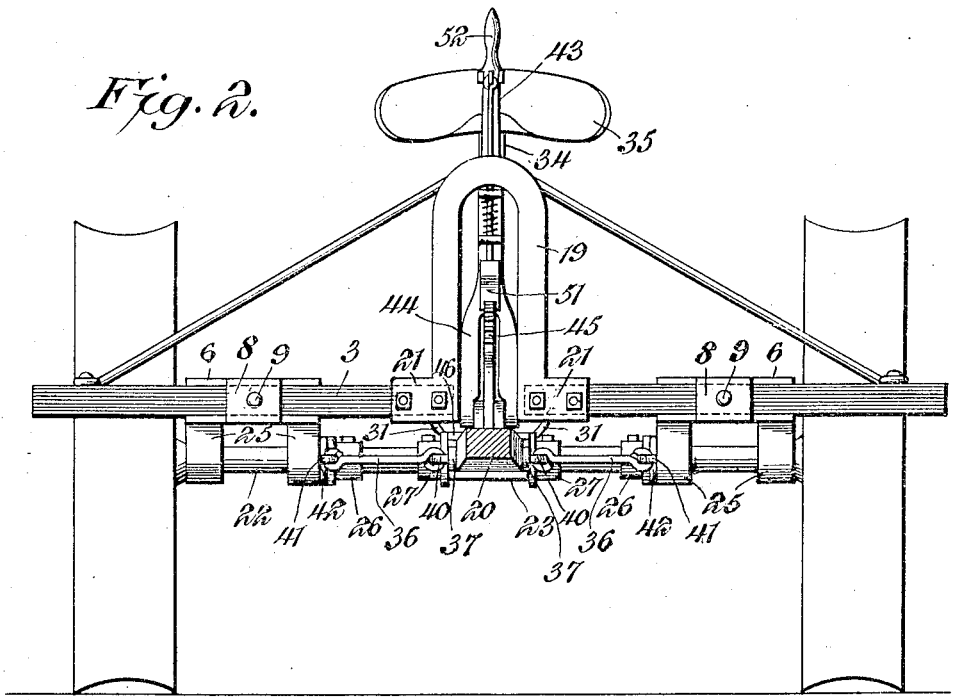
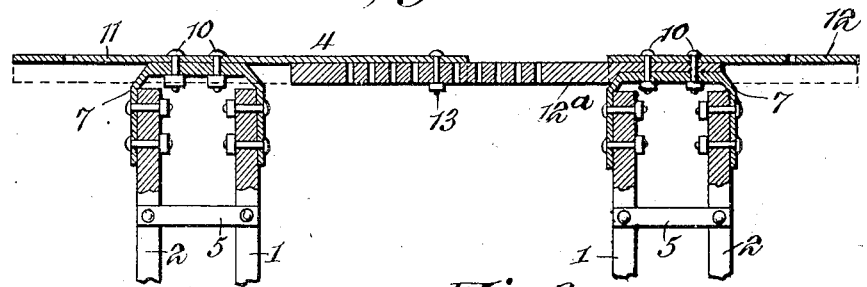
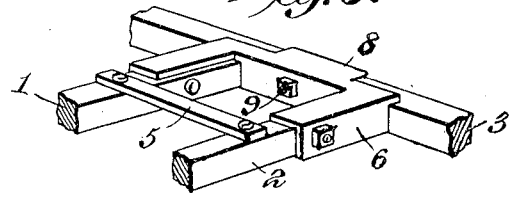
Witnesses
Howard D. Orr
H. F. Riley
Pehr Christiansson, Inventor,
By E. G. Siggers
Attorney No. 876,297. PATENTED JAN. 7, 1908.
P. CHRISTIANSSON.
FRAME FOR AGRICULTURAL MACHINES.
APPLICATION FILED JUNE 4, 1907.
3 SHEETS—SHEET 3.
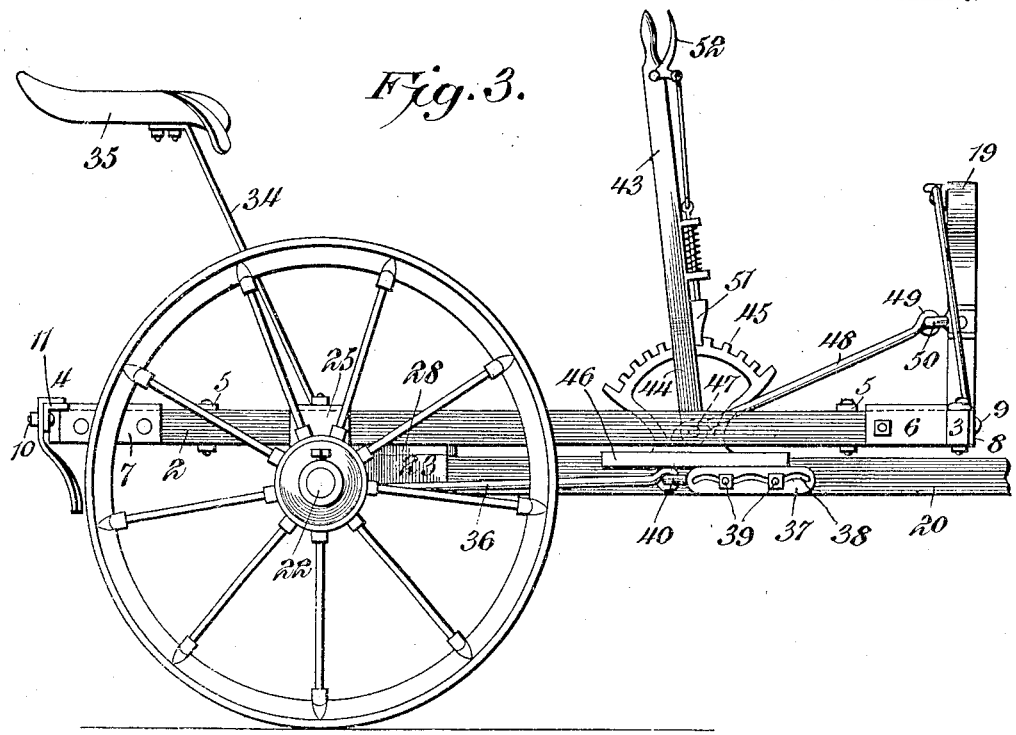
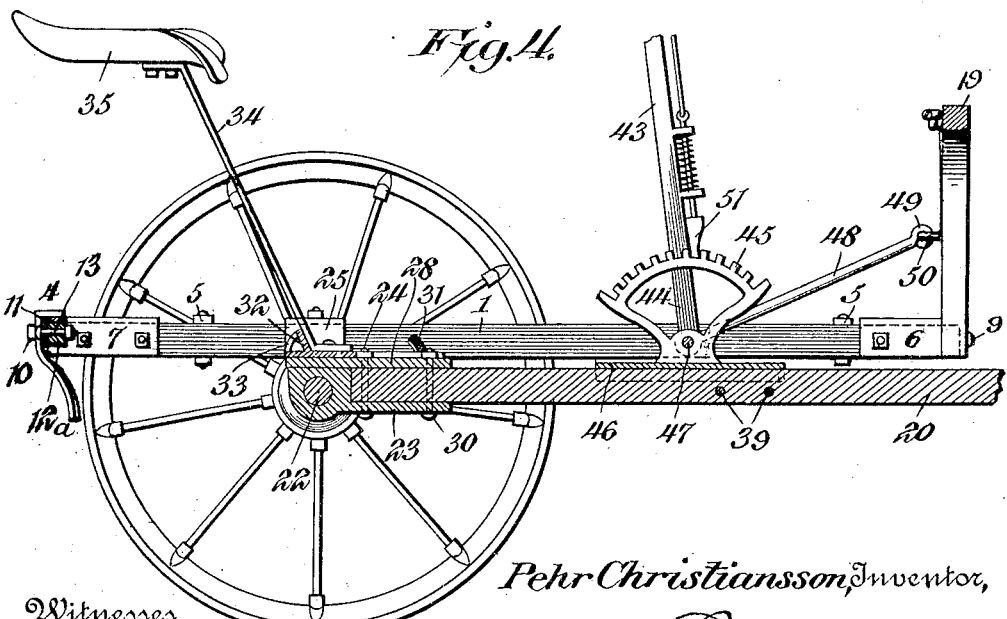
Pehr Christiansson, Inventor,
Witnesses
Attorney

UNITED STATES PATENT OFFICE.

PEHR CHRISTIANSSON, OF CARLOS, MINNESOTA.

FRAME FOR AGRICULTURAL MACHINES.

No. 876,297.  Specification of Letters Patent.  Patented Jan. 7, 1908.

Original application filed July 6, 1906, Serial No. 324,982. Divided and this application filed June 4, 1907. Serial No. 377,207.

*To all whom it may concern:*

Be it known that I, PEHR CHRISTIANSSON, a citizen of the United States, residing at Carlos, in the county of Douglas and State of Minnesota, have invented a new and useful Frame for Agricultural Machines, of which the following is a specification.

The invention relates to a frame for agricultural machines, and is a division of the application filed by me on the sixth day of July, 1906, Serial No. 324,982, and is designed for use in connection with the corn planting mechanism, shown and described in the said application and other agricultural devices.

The object of the present invention is to improve the construction of frames for agricultural machines, and to provide a simple and comparatively inexpensive one capable of lateral adjustment to arrange it to correspond to the distance between the hills or rows, and capable also of being raised and lowered to arrange the device carried by it in the desired position with relation to the soil.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a frame, constructed in accordance with this invention. Fig. 2 is a front elevation of the same. Fig. 3 is a side elevation of the frame. Fig. 4 is a longitudinal sectional view. Fig. 5 is a horizontal sectional view of the rear portion of the frame. Fig. 6 is a detail perspective view of a portion of the front of the frame, illustrating the construction of the front yokes.

Like numerals of reference designate corresponding parts in all the figures of the drawings.

1 and 2 designate inner and outer parallel side bars or beams, arranged in pairs and constituting the sides of the frame, which is provided at its front and rear with transverse bars 3 and 4. The parallel side bars 1 and 2 are connected at intermediate points by suitable cross pieces 5 and are secured at their ends to the sides of front and rear yokes 6 and 7, which are substantially U-shaped. The sides of the yokes are flanged and the bars 1 and 2 are secured to the inner faces of the same. The side bars or beams are adjustable toward and from each other to vary the width of the machine to correspond to the distance between the rows, and for this purpose, the front yokes are provided with sleeves or boxes 8, which are slidable on the front transverse bar 3 and are secured in their adjustment by means of bolts 9.

The rear yokes are secured by bolts 10 to the rear transverse bar, which is composed of spaced flanged sections 11 and 12, connected together by an intermediate section $12^a$ adjustably secured to the section 11 at the median line of the machine by a bolt 13. The said intermediate section $12^a$ is secured to the other section 12 by the fastening device 10 for securing the adjacent rear yoke to the section $12^a$.

The front transverse bar is also composed of two sections, which are connected at their inner ends by means of an upwardly extending arch 19, which projects upwardly from the front of the frame and which provides an opening or recess to receive the tongue or draft beam 20 of the machine. The upwardly projecting connecting arch is provided with laterally extending arms or portions 21, having horizontal flanges at their upper and lower edges and receive the inner ends of the sections of the front transverse bar. The lateral extensions of the arch are secured to the sections of the front transverse bar by means of horizontal bolts, or other suitable fastening devices, which are located between the upper and lower flanges.

The draft beam or tongue extends rearwardly along the median line of the frame, and its end is connected to an axle 22 by means of a socket 23, having a transverse bearing opening for the shaft and provided with a longitudinal recess in which the rear end of the tongue or draft beam is secured by suitable fastening devices 24. The axle 22, which is journaled in suitable bearings 25 of the side bars or beams 1 and 2, is held against lateral movement by means of collars 26, secured to the axle by set screws and arranged adjacent to the inner bar 1. The socket 23 is retained against lateral movement by means of collars 27, secured to the axle by set screws and located at the side edges of the said socket 23, as clearly illustrated in Fig. 1 of the drawings.

Arranged upon the upper face of the rear end of the tongue is an adjustable foot plate 28, forming a top for the socket 23 and provided at opposite sides with longitudinal slots 29, which receive bolts 30, or other suitable fastening devices for adjustably securing the foot plate and the tongue to the socket. The foot plate is provided with lateral extending foot rests 31, arranged to receive the feet of the driver. The rear portion of the adjustable foot plate is provided with an upwardly projecting inclined flanged portion 32, which is supported by an integral brace 33 and to which is secured the lower end of a spring standard 34 of a seat 35, which is movable backwardly and forwardly with the adjustable foot plate, so as to position the driver properly with relation to the devices carried by the frame.

The tongue is braced by inclined rearwardly diverging rods 36, provided with terminal eyes and connected at their front ends with the side edges of the tongue by means of adjustable plates 37, having waved longitudinal slots 38 for the reception of bolts 39, which pierce the tongue and which securely hold the brace from slipping. The plates 37 are provided at their rear ends with eyes 40 into which the front terminal eyes of the rods 36 are linked. The rear terminal eyes of the rods 36 are linked into eyes 41 of collars or rings 42, arranged on the axle and interposed between the collars 26 and the bearings of the inner bar 1. The connection between the rear ends of the rods or braces 36 and the axle form hinged joints, which conform to the relative adjustment of the tongue and the frame.

The frame is raised and lowered by means of an adjusting lever 43, mounted on the tongue and provided with a forked lower portion 44, which straddles a toothed segment 45. The toothed segment 45 is formed integral with and extends upwardly from a plate 46, which is mounted upon a tongue. The lever is fulcrumed at the lower end of its forked portion by means of a pivot bolt 47, or other suitable fastening device, which is arranged at the bottom of the toothed segment. The lever is adapted to swing backwardly and forwardly, and it is provided at the sides of its forked portion with forwardly projecting arms 48, which are connected with the sides of the upwardly projecting arch 19, whereby when the lever is oscillated, the front of the frame will be swung upwardly or downwardly. The arms 48 of the lever 43 are provided at their front ends with eyes 49, which are linked into eyes 50 of the sides of the arch 19. The eyes 50 are provided with shanks or plates, which are secured to the outer edges of the sides of the arch at a point between the top and bottom thereof. The frame adjusting lever is secured in its adjustment by a spring actuated pawl or detent 51, which is arranged to engage the teeth of the segment 45, and which is controlled by a latch lever 52, fulcrumed on the lever 43 adjacent to the upper end thereof.

Having thus fully described my invention, what I claim as new and desire to secure by Letters Patent, is:—

1. A frame comprising longitudinal side bars or beams, a rear transverse bar consisting of spaced sections secured to the rear ends of the side bars or beams and an intermediate section adjustably connecting the spaced sections, a front transverse bar, and means for adjustably connecting the side bars or beams to the front transverse bar.

2. A frame comprising laterally adjustable bars or beams, a rear transverse bar consisting of spaced flanged sections fixed to the side bars or beams and an intermediate section fixed to one of the flanged sections and adjustably secured to the other, a front transverse bar, and means slidable on the front transverse bar for connecting the side bars or beams with the same.

3. A frame comprising laterally adjustable side bars or beams arranged in pairs, front and rear transverse bars, and metallic yokes secured to the front and rear transverse bars and having their sides secured to the terminals of the side bars or beams and connecting the members of each pair of the same together and to the front and rear transverse bars.

4. A frame comprising laterally adjustable side bars or beams arranged in pairs, a rear transverse bar composed of adjustably connected sections, a front transverse bar, and front and rear yokes connecting the side bars or beams and having parallel flanged sides receiving the same, the rear yokes being fixed to the sections of the rear transverse bar, and the front yokes being provided with sleeves slidable on the front transverse bar.

5. The combination of a frame provided at the front with a substantially arch-shaped member having a recess or opening, an axle located in rear of the said member and supporting the frame, a tongue connected with the axle and operating in the recess or opening, and an adjusting lever mounted on the tongue and provided with a forwardly extending arm connected with the arch-shaped member of the frame for raising and lowering the latter.

6. The combination of a frame provided at the front with a substantially arch-shaped member having a recess or opening, an axle located in rear of the said member and supporting the frame, a tongue connected with the axle and operating in the recess or opening, and a forked adjusting lever mounted on the tongue and having spaced arms extending to and connected with the sides of the arch-shaped member for raising and lowering the frame.

7. The combination of a frame, an axle supporting the frame, a socket hinged to and movable with the axle, a tongue secured in the socket, and adjusting means connected with the tongue and the frame for raising and lowering the latter.

8. The combination of a frame provided at its front with an upwardly projecting arch shaped member, an axle supporting the frame, a tongue connected with the axle, and an adjusting lever mounted on the tongue and provided with arms connected with the arch shaped member at a point above the frame for raising and lowering the latter.

9. The combination of a frame, an axle supporting the frame, a tongue connected with the axle, adjustable plates mounted on the tongue at opposite sides thereof, and rearwardly diverging braces connected with the plates and secured to the axle.

10. The combination of a frame, an axle supporting the frame, a tongue connected at its rear end with the axle, a toothed segment mounted on the tongue in advance of the axle, a forked adjusting lever fulcrumed on the segment and provided with forwardly extending arms connected with the front of the frame for raising and lowering the latter, and means carried by the adjusting lever for engaging the segment.

11. The combination of a frame, an adjustable foot plate provided with laterally projecting foot rests, and a seat provided with supporting means mounted on and carried by the foot plate in its adjustment.

12. The combination of a frame, an adjustable foot plate provided with foot rests and having a projecting flanged portion, and a seat provided with a standard secured to the projecting flanged portion and carried by the foot plate in its adjustment.

13. The combination of a frame, an axle supporting the frame, a socket open at the top and hinged at the back to the axle, a tongue having its rear end fitting in the socket, and a foot plate forming the top wall of the socket.

14. The combination of a frame, an axle supporting the frame, a socket open at the top and hinged at the back to the axle, a tongue having its rear end fitted in the socket, and an adjustable foot plate forming the top wall of the socket, and a seat carried by the foot plate in its adjustment.

15. The combination of a frame, an axle, a socket open at the top and provided with means for receiving the axle, a tongue fitting in the socket, an adjustable plate forming the top wall of the socket and provided with foot rests extending laterally from the foot plate and projecting beyond the socket, and a seat having a standard secured to the foot plate.

In testimony that I claim the foregoing as my own, I have hereto affixed my signature in the presence of two witnesses.

PEHR CHRISTIANSSON.

Witnesses:
C. H. LARSON,
GEO. STROMLUND.